Aug. 25, 1931.   G. KOMP, SR   1,820,464
ICE SCORING MACHINE
Filed Jan. 23, 1928   5 Sheets-Sheet 1

Inventor
George Komp, Sr.
By F. L. Peyton, Jr.
Attorney

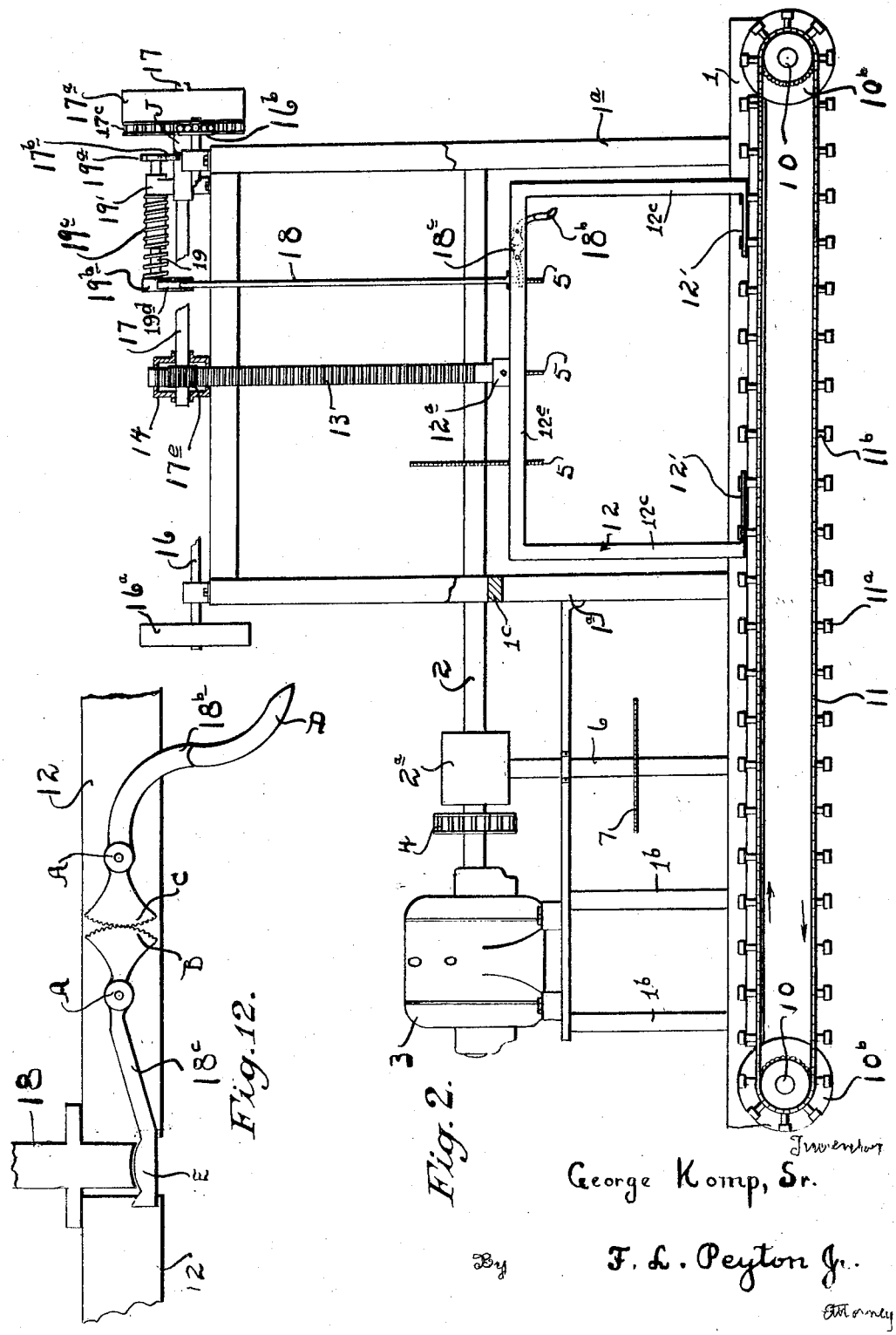

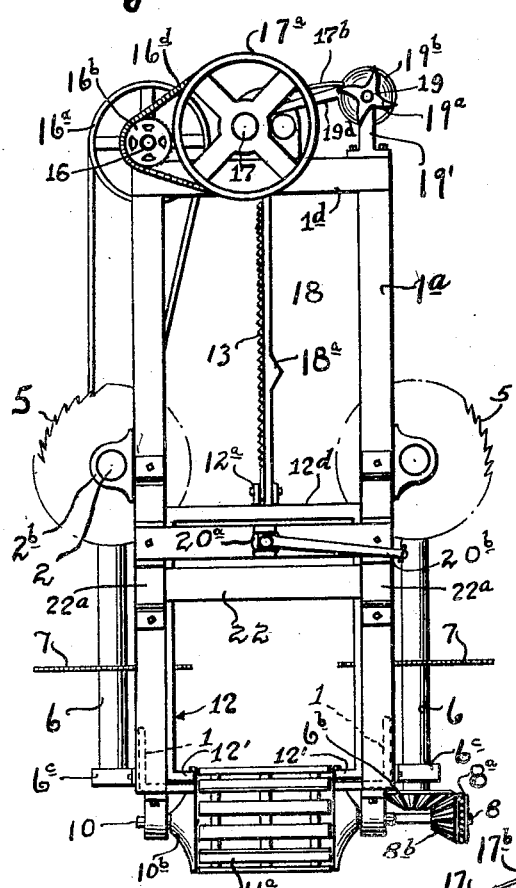

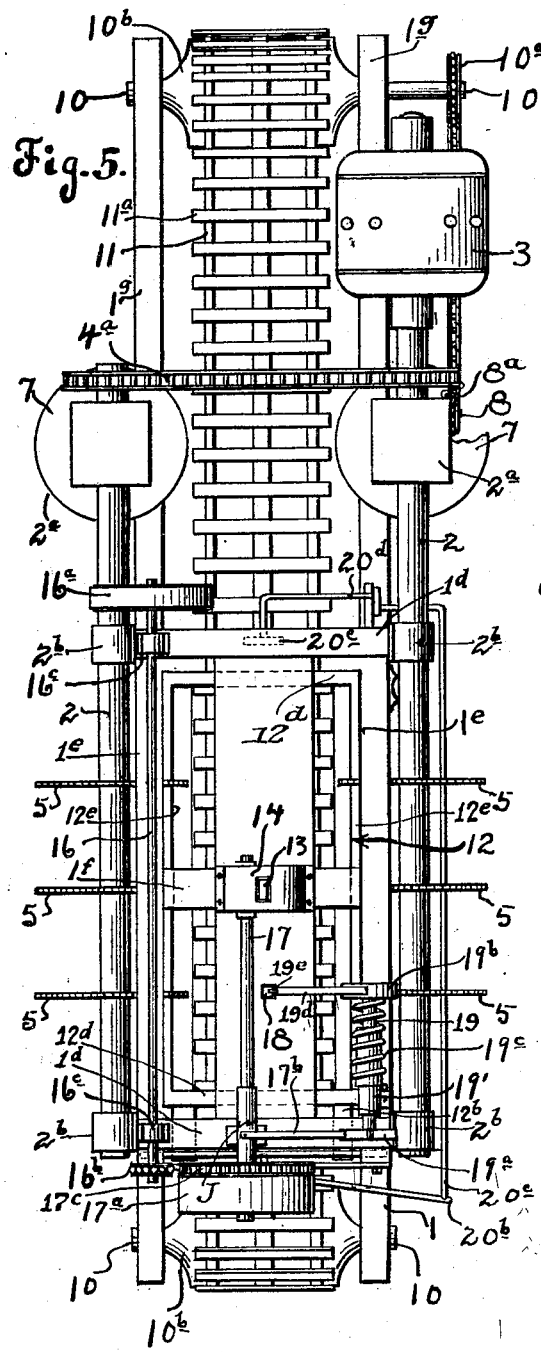

Aug. 25, 1931.                G. KOMP, SR                 1,820,464
                           ICE SCORING MACHINE
                     Filed Jan. 23, 1928    5 Sheets-Sheet 5
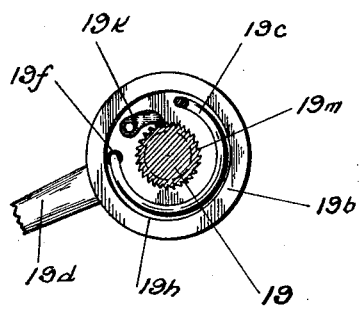
Fig. 13.
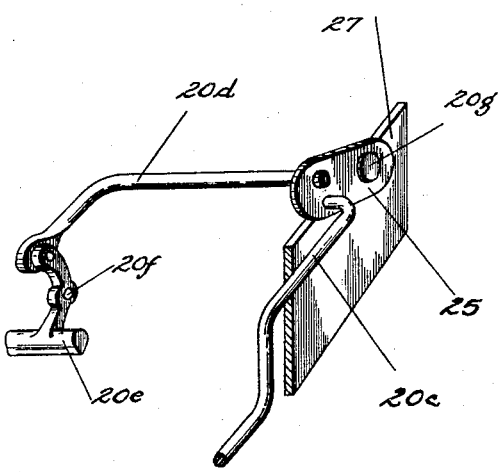
Fig. 14.
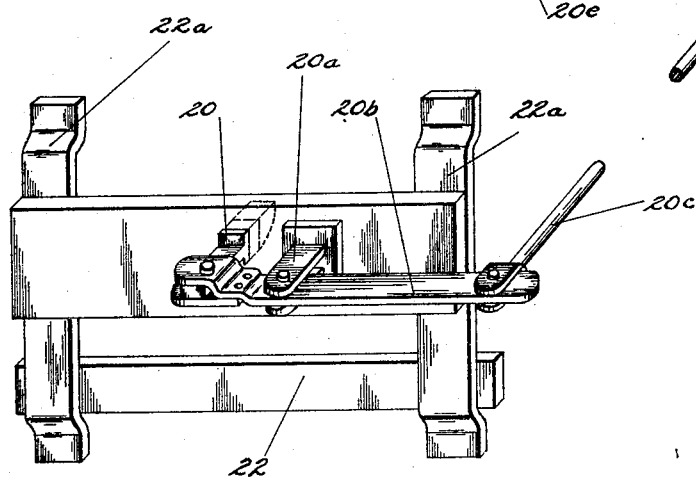
Inventor
George Komp Sr.
By Emery, Booth, Varney & Holcombe
Attorney Patented Aug. 25, 1931

1,820,464

UNITED STATES PATENT OFFICE

GEORGE KOMP, SR., OF HATTIESBURG, MISSISSIPPI, ASSIGNOR, BY MESNE ASSIGNMENTS, TO GENERAL ICE SCORING MACHINE COMPANY, A CORPORATION OF DELAWARE

ICE SCORING MACHINE

Application filed January 23, 1928. Serial No. 248,674.

My invention relates to improvements in ice-scoring machines such as are used for scoring a large cake of ice so that it can be readily separated into a plurality of blocks of more or less uniform size and shape.

Briefly stated, the invention has for one of its primary objects to provide a relatively simple, highly durable and efficient machine of this kind which may be rendered entirely automatic in operation, thus requiring a minimum of attention when in use and effecting a tremendous saving in overhead expense.

A further object of the invention resides in the provision, in a machine of this class, of means actuated by the work for effecting engagement of the same to certain of the scoring elements.

Another object is to incorporate in an ice scoring machine, a work-actuated stop for temporarily halting the movement of the work in one direction at a given point and a subsequently operable carrier for moving the work in another direction to present it to scoring elements.

A further object of the invention resides in the provision, in a machine as characterized, of a work-actuated stop and a reciprocal work-carrier movable transversely of the normal path of the work, which carrier has means for moving the stop out of work-engaging position so that the work can be moved in its original path at a predetermined time.

A still further object of the invention resides in the provision, in a machine of this class, of combined cushioning and guide means for a work-carrier.

Still another object is to provide an ice-scoring machine having a work-carrier, the driving means of which is initially thrown into operation by work-actuated means, and which is kept in operation for a predetermined time and subsequently thrown out of operation by carrier-carried means.

The invention also resides in certain novel features of construction, combination, and arrangement of the various parts and in modes of operation, which will readily manifest themselves to those skilled in the art in the reading of the following detailed description and appended claims, reference being had to the accompanying drawings forming a part of this specification.

In accordance with the patent statutes, the now preferred embodiment of the invention has been illustrated and will be described. However, it is to be understood that the invention is capable of other mechanical expressions within the spirit and scope of the appended claims.

In the drawings, wherein the same reference characters have been used to designate the same parts in all views and in which the showing of details of construction is somewhat diagrammatic for simplicity.

Figure 2 is a side elevation thereof from the opposite side, with a portion of the frame and other parts broken away, and with one of the horizontal and one of the vertical shafts on which the saws are mounted, removed to better disclose portions of the structure;

Figure 3 is an end elevation;

Figure 4 is an end elevation, with portions broken away and removed, disclosing the elevator structure, elevating gear with associated parts and also a combined guide and hydraulic brake construction system associated with the frame and elevator for guiding the latter and breaking the force of its fall;

Figure 5 is a top plan view;

Figure 6 is a broken top plan thereof, including the elevator and certain adjacent parts, particularly disclosing the connections employed in the hydraulic brake or buffer construction, and the raising and lowering devices for the automatic gate or work-stopping cross-bar at the discharge end of the machine;

Figure 7 is a broken side view of the trigger arrangement employed to close the automatic gate or cross-bar;

Figure 8 is a broken view of the elevator trigger and relative mechanism;

Figure 9 is a cross sectional view of the friction clutch employed in the elevating means;

Figure 10 is a top plan of same;

Figure 11 is a variation of the clutch mechanism;

Figure 12 is a side view of the segment gear trigger for actuating the trip-cam of the automatic clutch control;

Figure 13 is a sectional view on the line 13—13 of Figure 1 showing a pawl and ratchet drive connection between shaft 19 and disk 19ᵇ; and Figure 14 is a diagrammatic perspective view of the stop holding latch and associated parts.

The frame

Figure 1:
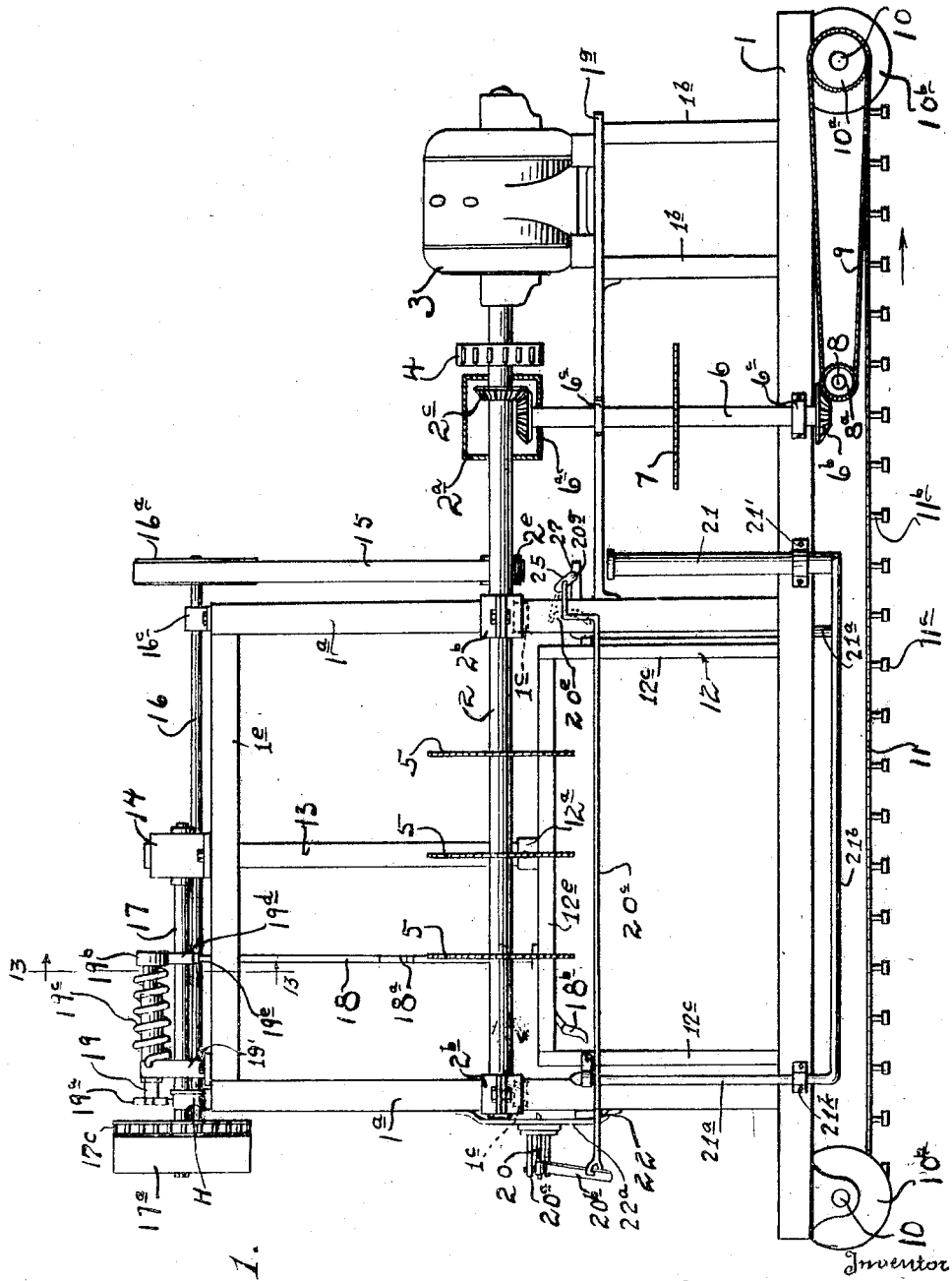
Figure 1 is a side elevation of the device.

Referring specifically to the drawings, wherein the same reference characters have been employed to designate the same parts in all views, the machine comprises a frame including longitudinal sills 1, which are spaced apart, as indicated in Figure 3, and from which rise the vertical posts 1ᵃ, 1ᵇ, which are shown in Figures 1 and 2. The posts 1ᵃ, are bound by cross pieces 1ᶜ, 1ᵈ. The cross pieces 1ᶜ are located intermediate the ends of the elongated upstanding posts 1ᵃ. The intermediate cross pieces 1ᶜ are shown in Figure 1, while one of such cross pieces is shown in cross section in the broken side elevational view, Figure 2.

The tie or cross pieces 1ᵈ are disposed at the upper ends of the elongated frame posts 1ᵃ, as clearly indicated in Figures 3, 4, 5 and 6, one of said top cross pieces 1ᵈ being also shown in Figure 8.

Figures 1, 2, 5 and 6 illustrate longitudinal connecting bars or members 1ᵉ for connecting the tops of the posts 1ᵃ, while Figure 5 shows a cross piece 1ᶠ intermediate the ends of longitudinal frame members 1ᵉ for connecting the same.

In connection with the sills 1 and the upstanding elongated posts 1ᵃ, it is desired to state that these members are preferably of angle, or L-shaped, cross section so that the sills will present inturned flanges (see Figure 3) for supporting an elevator, while the members 1ᵃ constructed in angular cross section, as aforesaid, may serve to guide the elevator in its movement.

In connection with the frame of the machine, reference has been made to upstanding posts 1ᵇ. These are shown in the elevational views, Figures 1 and 2, and from an inspection of Figures 1, 2, 3 and 5, it will be evident that such posts or members 1ᵇ are disposed at but each side of the frame. Four of such posts or members 1ᵇ are illustrated, 2 at each side, and their tops are bound together by longitudinal bars 1ᵍ, which are suitably connected to the adjacent elongated upstanding posts 1ᵃ, as indicated in Figures 1 and 2.

The foregoing concludes the description of the machine frame proper. Manifestly the cross pieces 1ᶜ etc. can be multiplied, if desired, without the exercise of invention. I have shown a minimum number of such cross pieces 1ᶜ so as not to obscure the working parts of the machine.

The scoring saws

At each side of the frame and journalled in bearings 2ᵇ mounted on the posts 1ᵃ, substantially mid-way their ends, are saw shafts 2.

Figure 5 clearly indicates that the saw shafts 2 extend a substantial distance beyond the intermediate pair of upstanding posts 1ᵃ. This figure also shows that one of said saw shafts 2 has a driving connection with the armature shaft of a motor 3, which is suitably mounted upon the longitudinal bar 1ᵍ, (Figure 1) which is supported by the short upstanding posts 1ᵇ at one side of the frame of the machine.

Still referring to Figure 5 and incidentally to Figures 1 and 2, it will be manifest that the second saw shaft 2 is driven from the other saw shaft by means of a chain 4ᵃ trained over sprocket gears 4 which are keyed to the respective saw shafts 2. The circular saws 5, (shown in Figures 1, 2, 3, 4 and 5) are keyed to the shafts 2, or otherwise secured thereto, and the peripheries of such saws extend inwardly of the frame into the path of the elevator to act upon the ice carried thereby, all of which will be referred to more in detail hereinafter.

Referring particularly to Figures 1 and 3, and incidentally to the top plan view, Figure 5, it will be noted that each of the horizontal saw shafts 2 has keyed thereon a beveled gear 2ᶜ, which meshes with the beveled gear 6ᵃ at the upper end of a vertical shaft 6. This shaft is journalled in bearings 6ᶜ, which are carried by the longitudinal frame members 1ᵍ and the subjacent sill members 1. Figure 3 very clearly shows that there is a shaft 6 at each side of the frame and also that such shafts carry saws 7 keyed thereon, the peripheries of which saws 7 extend into the space within the frame, as indicated in Figure 5. The saws 7 are disposed so as to score the ice longitudinally as it is carried through the machine by the conveyor bed 11, 11ᵃ, which will be dealt with more particularly later on.

The ice conveyor

Figure 1 shows one of the vertical saw shafts 6 as extending beyond its lower bearing 6ᶜ and having keyed upon its end a beveled gear 6ᵇ, which beveled gear meshes (Figure 3) with the cone or beveled gear portion 8 of a sprocket 8ᵃ which is keyed upon the shaft 8. Still referring to Figures 1 and 3 it will be manifest that the shaft 8 is carried in suitable bearings secured beneath and transversely of the sill members 1.

The shaft 8 (Figures 1 and 3) is the drive shaft for the conveyor 11, 11ᵃ, referred to incidentally hereinbefore. A chain 9 from the sprocket gear 8ᵃ (Figure 3) extends around a sprocket gear 10ᵃ on a projected end 10 of one of the drum shafts which carry the sprocket drums 10ᵇ. Over the sprocket drums 10ᵇ are trained the side chains 11 of the conveyor which is completed by the cross pieces 11ᵃ connecting said chains and secured thereto in a usual or any preferred manner. The conveyor is driven in the direction of the arrows, shown in Figures 1 and 2, so as to convey the ice first past the opposed horizontally disposed saws 7 on the vertical shafts 6 so that the ice will be longitudinally scored at each side in a common plane. After being acted upon by the saws 7 the ice is carried into the enclosure defined by the upstanding posts 1ᵃ to be lifted by the elevator 12, which is located therein, so that the saws 5 will act upon the ice to score it vertically in the upward movement of the elevator.

Figures 1, 2 and 5 illustrate gear boxes or housings 2ᵃ carried by the shafts 2 for enclosing the beveled gears 2ᶜ, 6ᵃ.

Referring to Figure 3 it is immaterial whether the beveled gear 8ᵇ and sprocket 8ᵃ are separate or integral. The main point is that they be fast on the shaft 8.

The elevator

The elevator 12 comprises a rectangular frame including corner posts 12ᶜ, the tops of which are connected by transverse and longitudinal bars 12ᵈ, 12ᵉ, respectively.

Figures 3 and 4 and the broken side elevational view, Figure 2, show that the corner posts 12ᶜ of the elevator have short longitudinally and inwardly extending flanges or feet 12′ which normally rest, (Figure 3) upon the inturned flanges of the sills 1 of the frame, with their top faces or surfaces slightly below the plane of the cross pieces 11ᵃ of the top flight of the conveyor 11, 11ᵃ and slightly to one side of the same so that when the elevator is lifted the cake of ice will be lifted up from the conveyor 11, 11ᵃ. It is understood, of course that the ice cake will project laterally at each side of the conveyor so as to overlie said elevator feet 12′.

Ice for commercial purposes is usually frozen in tapered containers and as a result, the blocks of artificial ice are tapered lengthwise, and in the accurate scoring of such blocks this taper is to be considered. My invention comprises means to compensate for this taper during the transverse scoring of such blocks while carried by the elevator 12, to position the transverse score marks perpendicular to the central longitudinal axis of the block for symmetrical transverse subdivision thereof. In the illustrative embodiment of my invention this means is provided by forming the elevator 12 with the lower front end thereof raised slightly (approximately one half inch if the block is one inch higher at its large end than at its small end, as is usual) to position the longitudinal axis of the block perpendicular to the planes of the scoring saws.

Elevator operating mechanism

The elevator 12 is lifted by means of a rack bar 13, which is secured to an intermediate top cross member 12ᶠ (Figures 1, 2, 3, 4, 5 and 6) as indicated at 12ᵃ. The rack bar 13 extends upwardly through the intermediate frame cross bar 1ᶠ (Figure 5) and through a casing 14 carried by said cross bar 1ᶠ. Within the casing 14 extends the end of a shaft 17 on which is keyed a spur gear 17ᵉ which meshes with the teeth of the rack bar 13. A roller 23 journalled on a short shaft carried by said housing 14 bears against the back of the rack bar, thus, maintaining the same in meshing engagement with the gear 17ᵉ.

The shaft 17, which carries the spur gear 17ᵉ, is journalled in bearings provided by housing 14 (Figure 5) and in a bearing H carried by the end cross bar 1ᵈ (see Fig. 9).

Figures 1, 2, 3, 5 and 9 illustrate that the outer end of the shaft 17, which projects beyond the exit end of the frame, is provided with a cup-like fly wheel 17ᵃ, which is keyed or otherwise rigidly secured to said shaft. Loosely mounted upon the shaft 17 and adjacent the cup-like fly wheel 17ᵃ is a sprocket gear 17ᶜ, which has a marginal laterally extending flange 17ᵈ (see Fig. 9) which is inwardly beveled to engage the corresponding bevel of fly wheel 17ᵃ.

The matingly beveled flanges of the fly wheel and sprocket gear 17ᵃ, 17ᶜ, respectively, are kept normally separated by means of a coil spring Q, which encircles the shaft 17 and bears against said elements for this purpose. The fly wheel 17ᵃ and the sprocket gear 17ᶜ constitute a friction clutch, the sprocket gear 17ᶜ being the driven element receiving its constant rotation from a shaft 16, which is journalled in bearings 16ᶜ mounted upon frame members 1ᵈ at one side of the frame and which has a sprocket gear 16ᵇ which drives the sprocket gear 17ᶜ through a chain 16ᵈ (see Fig. 3).

The shaft 16 is constantly driven by means of a belt 15 passing around a pulley 2ᵉ on the subjacent horizontal saw shaft 2 and a pulley 16ᵃ on the inner end of the shaft 16 which projects beyond the inner upstanding posts 1ᵃ.

Automatic clutch control for elevator drive means

The sprocket gear 17ᶜ, which is the normally driven element of the clutch 17ᶜ, 17ᵃ is actuated into driving engagement with the fly wheel 17ᵃ through instrumentalities, which are set into operation by the cake of ice when it is carried by the conveyor to a centered position within the frame 1ª, 1ª and the elevator 12.

In carrying out this feature of the invention, I provide, as indicated in Figures 9 and 10, the bearing H of shaft 17 with a cam end H'. Adjacent said bearing cam H' and between the same and the loose sprocket clutch element 17ᶜ is a loose sleeve J having a cam end J' opposed to the cam H' of the bearing H. It will be manifest that rotation of the loose sleeve J in one direction will throw the same axially along the shaft 17 to force the loose sprocket 17ᶜ into driving engagement with the fly wheel 17ª, thus putting the shaft 17 in motion. Obviously this will actuate the rack bar 13 to lift the elevator 12.

A lever arm 17ᵇ is rigidly carried by the sleeve J and this arm 17ᵇ is adapted to be swung by a star gear 19ª a sufficient distance to engage the clutch elements 17ª, 17ᶜ. The relationship of the lever arm 17ᵇ and star gear 19ª is shown in Figures 1, 2, 3, 5 and 8.

The star gear 19ª is mounted on the outer end of the stub shaft 19, which is journalled in a bearing 19', mounted upon one top longitudinal frame member 1ᵉ, as indicated in Figure 5. The star gear 19ª is diametrically opposite the arm 17ᵇ of the sleeve J. The opposite end of the shaft 19 has a disk 19ᵇ thereon, there being any conventional or preferred form of one way drive, as for example, the pawl and ratchet drive connection 19ᵏ, 19ᵐ between the shaft 19 and said disk 19ᵇ, shown in the detail view, Figure 13. The pawl and ratchet drive 19ᵏ, 19ᵐ is adapted to actuate the shaft 19 when the disk is moved in a clockwise direction, as viewed in Figure 8. The disk 19ᵇ is provided with a radial arm 19ᵈ (which may be provided with a roller 19ᵉ for engaging the cam-rod 18 as best shown in Fig. 5), which normally rests against the beveled upper end 18' of a rod 18, which is carried by a cross member of the elevator 12, as indicated in the detail view, Figure 12.

Figures 1 and 5 clearly illustrate that the shaft 19 is provided with a coil spring 19ᶜ, having its outer end anchored, as at 19ᵉ to the bearing 19. The inner end of the spring 19ᶜ is suitably connected to urge the arm 19ᵈ in a counter-clockwise direction as viewed in Fig. 8, as by extending into a surface recess 19ᶠ in the surface recess 19ʰ in the adjacent face of the disk 19ᵇ, as shown in Figure 13. It is believed to be obvious that the action of spring 19ᶜ is to return the disk 19ᵇ with its arm 19ᵈ to the normal position shown in full lines in Figure 8, after the same has been actuated to the dotted line positions (Figure 8) by the action of the rod 18.

Manifestly, upward movement of the rod 18 results in the actuation of the arm 19ᵈ to the first dotted line position in Figure 8. This rotates the shaft 19 in a clockwise direction and likewise the star wheel 19ª which is keyed thereon. This, of course, results in the swinging of the arm 17ᵇ in a counter-clockwise direction to a slight degree, thus, forcing the sleeve J to bring the clutch elements 17ª, 17ᶜ together so as to drive the shaft 17 with its spur gear 17ᵉ so as to draw the elevator up through the engagement of the spur gear 17ᵉ with the rack bar 13.

It is important to observe that the arm 19ᵈ will maintain the intermediate or first dotted line position, Figure 8, as the rod 18 is moved upwardly by the elevator. As a result, the clutch elements 17ª, 17ᶜ will be held in driving engagement and the shaft 17 will continue to rotate.

Referring to Figures 1, 2 and 12, it will be noted that the elevator is provided with a depending trigger member 18ᵇ, pivoted intermediate its ends, and having its inner end provided with a gear segment C meshing with a corresponding gear segment B of a lifting arm 18ᶜ, which engages the lower end of the rod 18 (Figure 8) as shown in Figure 12. The members 18ᵇ, 18ᶜ are pivoted on cross rods A extending between the longitudinal members 12ᵉ of the elevator frame. The trigger or arm 18ᵇ is extended laterally and downwardly in a position to be engaged by a cake of ice as it reaches a point adjacent the discharge end of the frame. Manifestly, upward swinging of the trigger 18ᵇ, will through the engagement of the gear segments C, B, swing the arm 18ᶜ upwardly to lift the bar 18. This causes the beveled upper end 18' of said bar 18 to actuate the arm 19ᵈ upwardly all as described hereinbefore. Thus, through the star wheel 19ª and arm 17ᵇ the sleeve J is actuated to engage the clutch elements 17ª, 17ᶜ. The previously described rotation of shaft 17 results.

Upward movement of the elevator continues until the cam 18ª of the rod or shaft 18 engages the arm 19ᵈ and moves it to the uppermost dotted line position Z shown in Figure 8. When this occurs the shaft 19 will have been rotated far enough to cause the star wheel prong, which engaged the arm 17ᵇ, to pass beyond the same permitting the arm to move in a clockwise direction (Figure 8) under the influence of the spring Q acting through the sleeve J and the cam portions J', H' of the sleeve J and bearing H, respectively, the resulting release of the clutch 17ª, 17ᶜ, allowing the elevator 12 to descend by gravity, carrying with it the cam rod 18. The action of the spring 19ᶜ causes the disk 19ᵇ to immediately move in a counter-clockwise direction with its arm 19ᵈ to assume the lowermost dotted line position in Figure 8 as soon as the cam 18ª is carried from under the arm 19ᵈ. However, the shaft 19 will remain stationary and the star wheel 19ª consequently will remain in the position to which it was actuated by the engagement of the cam 18ª with the arm 19ᵈ. This is due to the pawl and ratchet drive connection between disk 19^b and shaft 19 (Figure 13).

The arm 19^d is retained in its lowermost dotted line position (Fig. 8) until the block of ice underlying the trip lever 18^b is carried out from under the latter, allowing the cam rod 18 to drop still lower and carry its cam surface 18' under the arm 19^d so that it may move to the full line position shown in Fig. 8, to arrange the elevator control structure in position to be actuated by the next block of ice raising the lever 18^b. Thus the lever 18^b, with its associated parts, when actuated by a block of ice, serves to initiate one operation of the elevator mechanism, and then to prevent re-operation of the elevator mechanism during movement of the ice from the elevator. With the four-pronged star wheel shown, it is obvious that the entire rotation thereof caused by the cam surfaces 18' and 18^a for one operation of the machine will be one quarter revolution.

As above mentioned, when arm 17^b disengages from the prong of the star wheel the clutch drive is broken and the elevator immediately descends to deposit the ice upon the conveyor 11, 11^a so that it can be carried out of the machine.

*Buffer check or brake for descending elevator*

As shown in Figures 1, 4, and 6 there is provided a main hydraulic brake chamber 21, which is secured to one of sill members 1, as indicated at 21'. From this chamber 21 lead pipe lines 21^b which connect with piston chambers 21^a, which are secured to the frame by means of keepers 21^k. Working in the cylinders 21^a are pistons 21^c (see Fig. 4), which are secured by brackets 21^e to two diagonal corners of the elevator frame, as shown in Figure 6. Manifestly, when the elevator descends the pistons working in the chambers 21^a will act as a brake or cushion to avoid a bump. It is also to be noted that the pistons 21^c, working in the chambers or cylinders 21^a act as guides for the elevator 12.

*Ice and elevator controlled stop*

As the ice moves into the frame carried by the conveyor 11, 11^a, it is manifest that it is very desirable to prevent the ice from slipping past the elevator before the same can operate. In order to prevent such a thing from taking place I provide at the exit end of the frame a pair of guides 22^a for receiving a vertically slidable cross bar 22. When the cross bar 22 is in its lowermost position, as shown in Figures 1 and 3 the cake of ice will be intercepted and prevented from passing out of the frame, which is to say, past the posts 1^a at the left of Figure 1. The stop bar 22 is adapted to be held in elevated position out of the path of the ice block by means of a latch 20 which is carried by a mounting 20^a, (Figures 1 and 3) there being provided a control arm 20^b, which is swingable to retract the latch to permit the stop bar 22 to drop. Figure 1 illustrates that the control arm 20^b of the latch has pivoted at its outer end and slightly beyond the side of the frame, the end of a rod 20^c, which is also shown in Fig. 6. Thus movement of this rod 20^c toward the entrance end of the machine swings the control arm 20^b and retracts the latch member 20 to allow the stop-bar 22 to fall from its elevated position. According to my invention, this operation is to be effected by work-actuated means, and in the referred embodiment of my invention this means comprises a depending shoe or element 20^e, shown diagrammatically in Figs. 1, 5 and 6, suitably connected to the rod 20^c, as by elements 20^d and 25, so that movement of the shoe 20^e by a block of ice will cause the latch member 20 to be withdrawn.

Figs. 7 and 14 show an illustrative construction in which the shoe 20^e is pivoted to the frame of the machine at 20^f in position to be engaged and pivoted by a block of ice entering the elevator. As shown, the shoe 20^e is pivoted at its center and as the ice strikes and moves its enlarged, heavy lower end toward the exit end of the machine, its upper end moves in the opposite direction, carrying with it the rod 20^d to which it is connected. The rod 20^d is in turn connected to an arm 25 pivoted at 20^g to the bracket 27 so that the movement of the rod 20^d causes the arm 25 to swing in a clockwise direction as viewed in Figs. 1 and 7. The rod 20^c is likewise connected to the arm 25, so that the movement of the arm 25 lifts and pulls the rod 20^c to retract the stop 20. In the embodiment shown the weight of the rod 20^c and the heavy lower end of the shoe 20^e are sufficient to impart counter-clockwise movement to the arm 25 as viewed in Fig. 1 and return the latch 20 to operative position after the ice has passed from under the shoe (and after the stop-bar 22 has been lifted past it by the members 12^b as hereinafter described), but it is obvious that other mechanical means can be employed to control the latch member 20, and that in such case, any suitable means, as a spring or the like, can be used to return the latch to its operation position after retraction.

Thus, broadly considered, my invention contemplates the provision of a stop mechanism to halt the ice-block in position to be raised by the elevator, means whereby the stop mechanism is rendered ineffective to allow the ice block to move from the elevator after scoring, and work-actuated means to render the stop mechanism effective for stopping the next block; and in the preferred embodiment of my invention this work actuated means is disposed to be actuated by the ice block entering the elevator.

From the foregoing it will be clear that in the illustrative embodiment shown, the ice block entering the elevator, by swinging the finger or shoe 20ᵉ in a clockwise direction retracts the latch 20 and allows the stop bar 22 to drop to the position shown in Fig. 1.

Bar 22 remains in such position until the cake of ice has been lifted by the elevator. Figure 6 shows that the elevator adjacent the discharge end is provided with bottom extensions 12ᵇ, which are adapted to intercept the stop bar 22 and lift the same to a point above the latch so that when the cake of ice is lowered in the elevator there will be no obstruction to prevent the same from being carried out by the conveyor 11, 11ª through the discharge end of the machine, which is at the left, as viewed in Figure 1.

*Manual clutch modification*

Figure 11 shows a modified form of the invention and particularly, a manually controlled clutch for the sectional elevator drive shaft 17ˣ, 17ʸ. Section 17ˣ may be driven from shaft 16 (see Figs. 3 and 5) by a chain over sprocket 17ʷ. Clutch elements T and S of shaft sections 17ˣ, 17ʸ serve to drive shaft section 17ʸ when the same is moved endwise through lever L to bring T, S into engagement. Lever L is pivoted as at P to a frame member 1ˣ. The rack bar 13, of Figure 4, is dispensed with and instead a cable O, attached to elevator 12, is wound on pulley M of shaft section 17ʸ.

Having thus described my invention, what I claim as new and desire to secure by Letters Patent is:

1. In an ice-scoring machine comprising a frame through which the work is adapted to be moved, and having scoring elements; the combination of a movable stop positionable across the path of the work to intercept and halt the same, work-actuated means for effecting the positioning of said stop in effective position, means movable in a plane at an angle to the path of movement of the work for effecting an operative engagement between scoring means and the work, and work-actuated means for setting said aforementioned movable means in operation.

2. In an ice-scoring machine comprising a frame through which the work is adapted to be moved, and having scoring elements; the combination of a movable stop positionable across the path of the work to intercept and halt the same, work-actuated means for effecting the positioning of said stop in effective position, movable means operable in a plane at an angle to the path of movement of the work for effecting an operative engagement between the scoring means and work, and means for setting said aforementioned movable means in operation.

3. In an ice-scoring machine comprising a frame through which the work is adapted to be moved, and having scoring elements; the combination of a movable stop positionable across the path of the work to intercept and halt the same, work-actuated means for effecting the positioning of said stop in effective position, means movable in a plane at an angle to the path of movement of the work for effecting an operative engagement between the scoring means and work, means for setting said aforementioned movable means in operation, and means operable by said aforementioned movable means for restoring said stop means to ineffective position whereby the work can be moved out of the machine after it has been scored.

4. In an ice-scoring machine comprising a frame through which the work is adapted to be moved, and having scoring elements; the combination of a movable stop positionable across the path of the work to intercept and halt the same, work-actuated means for effecting the positioning of said stop in effective position, means movable in a plane at an angle to the path of movement of the work for effecting an operative engagement between the scoring means and work, work-actuated means for setting said aforementioned movable means in operation, and means operable by said aforementioned movable means for restoring said stop means to ineffective position.

5. The combination set forth in claim 2, said aforementioned movable means normally assuming a non-obstructing position with respect to the path of the work and tending to assume such position upon completion of the scoring operation, and means in part carried by said aforementioned movable means and in part carried by said frame for maintaining the effective engagement of the scoring means and work for a predetermined period.

6. The combination set forth in claim 1, said aforementioned movable means normally assuming a non-obstructing position with respect to the path of the work and tending to assume such position upon completion of the scoring operation, and means in part carried by said aforementioned movable means and in part carried by said frame for maintaining the effective engagement of the scoring means and work for a predetermined period.

7. In an ice-scoring machine comprising a frame through which the work is adapted to be moved, and having scoring elements; the combination of a movable stop positionable across the path of the work to intercept and halt the same, work actuated means for effecting the positioning of said stop in effective position, an elevator slidably carried by said frame and normally maintaining a position to receive the work, said stop serving to halt the work when the same is in a position to be lifted by said elevator, means for actuating said elevator to move the work past the scoring elements, and means for effecting the return of the elevator to starting position on completion of the scoring operation.

8. The combination set forth in claim 7, and including means actuated by the elevator for moving said stop out of work engaging position whereby the work can be moved out of the machine upon the completion of the scoring operation.

9. The combination set forth in claim 7, and including means carried by the elevator for actuating said stop out of work engaging position so as to permit the work to pass from the machine on the completion of the scoring operation, and work actuated means for setting said elevator-driving means in operation.

10. In an ice-scoring machine comprising a frame and having an elevator within the frame into which the work is movable, actuating means for lifting the elevator to bring the work into engagement with scoring elements, clutch means for effecting the drive of said elevator-actuating means, means carried by the elevator and operable to actuate said clutch for driving said elevator-actuating means, trip means carried by the elevator and adapted to be engaged by the work when positioned therein, and said trip means moving said elevator-carried means relatively thereof to effect the driving of said elevator-actuating means through said clutch.

11. The combination set forth in claim 10, and means operated by said elevator-carried means in the actuation of the elevator for maintaining said clutch in driving engagement with said elevator-actuating means for a predetermined time.

12. In an ice-scoring machine having scoring elements and an elevator, actuating means for the elevator, a normally driven element, clutch means for establishing a driving connection between said driven element and said elevator actuating-means, a clutch control carried by said elevator, and means actuated by the work when within the elevator for moving said clutch control means into effective position for putting the elevator actuating-means into operation.

13. The combination set forth in claim 12, and means carried by the clutch control element of said elevator for effecting the movement of said clutch for breaking the drive of said elevator actuating-means upon the completion of the scoring operation.

14. In an ice-scoring machine, a frame, an elevator working in said frame, scoring elements past which the elevator is adapted to be moved, actuating means for the elevator, a rod carried by the elevator, means actuated by said elevator-carried rod for effecting the driving of said elevator actuating means, and work-actuated means for effecting an initial movement of said rod substantially as and for the purpose set forth.

15. In an ice-scoring machine comprising an elevator and driving means therefor embodying a clutch, a clutch actuating means carried by the elevator, and work actuated means for operating said clutch actuating means.

16. In an ice-scoring machine including a frame, scoring elements, an elevator movable past said scoring elements, clutch-actuated means for driving the elevator, control means for said clutch comprising a shaft carried by said frame, a lateral arm carried by said shaft and adapted to move the shaft in one direction, clutch-throw means, means on said shaft for operating said clutch-throw means to engage the clutch with said elevator drive when the shaft is moved in the aforementioned direction by said arm, means carried by said elevator and adapted to engage said arm for moving the same in the aforementioned direction and means for initially actuating the elevator-carried means relatively of the elevator to engage said arm.

17. In an ice-scoring machine including a frame, scoring elements, an elevator movable past said scoring elements, clutch-actuated means for driving the elevator, control means for said clutch comprising a shaft carried by said frame, a lateral arm carried by said shaft and adapted to move the shaft in one direction, clutch-throw means, means on said shaft for operating said clutch-throw means to engage the clutch with said elevator drive when the shaft is moved in the aforementioned direction by said arm, means carried by said elevator and adapted to engage said arm for moving the same in the aforementioned direction, and work-actuated means for initially moving said elevator carried means in a direction to engage said arm for setting the elevator in motion.

18. In an ice-scoring machine including a frame, scoring elements, an elevator movable past said scoring elements, clutch actuated means for driving the elevator, control means for said clutch comprising a shaft carried by said frame, a lateral arm carried by said shaft and adapted to move the shaft in one direction, clutch-throw cam means, means on said shaft for operating said clutch-throw means to engage the clutch with said elevator drive when the shaft is moved in the aforementioned direction by said arm, means carried by said elevator and adapted to engage said arm for moving the same in the aforementioned direction, work-actuated means for initially moving said elevator-carried means in a direction to engage said arm for setting the elevator in motion, means carried by said elevator-carried means for further actuating said arm in said aforementioned direction to disengage said clutch-throw means from the cam of said shaft, and means normally tending to disengage said clutch from driving engagement with said elevator actuating means.

19. In an ice-scoring machine comprising a frame through which the ice is adapted to be moved from one end to the other, scoring elements associated with said frame, a stop carried by said frame and movable into a position to intercept and halt the ice adjacent said scoring elements in its movement through said frame, and work actuated means for disposing the stop into effective position.

20. The combination set forth in claim 19, and including a carriage movable transversely of the path of the ice for effecting an operative engagement between the ice and scoring elements, and means actuated by said carriage for restoring the stop to ineffective position.

21. In an ice-scoring machine comprising a frame through which the ice is adapted to be moved, scoring elements, a transverse stop movable into the path of the work to intercept the same, guides carried by the frame and in which said stop is movable, a latch carried by said guides and adapted to support the stop in a position out of the path of the work, and trip means operated by the work for releasing said latch whereby said stop can drop to effective position.

22. The combination set forth in claim 21, and means operable in the scoring operation for actuating said stop out of work-intercepting position.

23. The combination set forth in claim 21, said scoring machine including a movable carriage for effecting operative engagement between the scoring elements and work, and said carriage having means engageable with said stop for lifting the same past said latch whereby the work may pass from the machine when the elevator is lowered.

24. In an ice-scoring machine comprising a frame through which the work is adapted to be moved, and having scoring elements, the combination of a movable stop positionable across the path of the work to intercept and halt the same, means responsive to entering work for effecting the positioning of said stop in effective position to intercept and halt said entering work, means operable in a plane at an angle to the path of movement of the work for effecting an operative engagement between the scoring means and said work, and means for setting said aforementioned movable means in operation.

25. In an ice-scoring machine comprising a frame through which the work is adapted to be moved, and having scoring elements; the combination of a movable stop positionable across the path of the work to intercept and halt the same, means responsive to entering work for effecting the positioning of said stop in effective position to intercept and halt said entering work, means movable in a plane at an angle to the path of movement of the work for effecting an operative engagement between the scoring means and said work, means for setting said aforementioned movable means in operation, and means operable by said aforementioned movable means for restoring said stop means to ineffective position whereby the work can be moved out of the machine after it has been scored.

26. The combination set forth in claim 25, said aforementioned movable means normally assuming a non-obstructing position with respect to the path of the work and tending to assume such position upon completion of the scoring operation, and means in part carried by said aforementioned movable means and in part carried by said frame for maintaining the effective engagement of the scoring means and work for a predetermined period.

27. In a ice-scoring machine comprising a frame through which the work is adapted to be moved, and having scoring elements; the combination of a movable stop positionable across the path of the work to intercept and halt the same, means responsive to entering work for effecting the positioning of said stop in effective position to intercept and halt said entering work, an elevator slidably carried by said frame and normally maintaining a position to receive the work, said stop serving to halt the work when the same is in a position to be lifted by said elevator, means for actuating said elevator to move the work past the scoring elements, and means for effecting the return of the elevator to starting position on completion of the scoring operation.

28. The combination set forth in claim 27, and including means actuated by the elevator for moving said stop out of work engaging position whereby the work can be moved out of the machine upon the completion of the scoring operation.

29. The combination set forth in claim 27, and including means carried by the elevator for actuating said stop out of work engaging position so as to permit the work to pass from the machine on the completion of the scoring operation, and work actuated means for setting said elevator driving means in operation.

30. In an ice-scoring machine comprising a frame through which the ice is adapted to be moved from one end to the other, scoring elements associated with said frame, a stop carried by said frame and movable into a position to intercept and halt the ice adjacent said scoring elements in its movement through said frame, and work-actuated means located in advance of said stop and adapted to be actuated by entering work for disposing the stop into effective position to intercept said entering work.

31. The combination set forth in claim 30, and including a carriage movable transversely of the path of the ice for effecting an operative engagement between the ice and scoring elements, and means actuated by said carriage for restoring the stop to ineffective position.

32. In an ice-scoring machine, a frame, an elevator working in said frame, scoring elements past which said elevator is adapted to be lifted, means for lifting said elevator, and work-actuated means for initiating opration of said elevator lifting means.

33. In an ice-scoring machine, a frame, an elevator working in said frame, scoring element past which said elevator is adapted to be lifted, means for lifting said elevator, work-actuated means for initiating operation of said elevator lifting means, and means preventing operation of the elevator lifting means during movement of the ice from the elevator.

34. In an ice-scoring machine, a frame, an elevator working in said frame, scoring elements past which said elevator is adapted to be lifted, means for lifting said elevator, work-actuated means for initiating operation of said elevator lifting means, and means for disengaging said elevator lifting means after a predetermined movement of said elevator.

35. In an ice-scoring machine, a frame, an elevator working said frame, scoring elements past which said elevator is adapted to be lifted, means for lifting said elevator, work-actuated means for initiating operation of said elevator lifting means, means for disengaging said elevator lifting means after a predetermined movement of said elevator, and means for controlling the return of said elevator to its initial position under the influence of gravity.

36. In an ice-scoring machine, a frame, an elevator working in said frame, scoring elements past which said elevator is adapted to be lifted, power-means for lifting said elevator, means for disengaging said elevator lifting means after a predetermined movement of said elevator, and hydraulic means for controlling the return of said elevator to its initial position under the influence of gravity.

37. An ice-scoring machine for scoring a commercial tapered block of ice handled on its narrow side or edge comprsing a reciprocable elevator cage to receive, support and transport the block on edge during the transverse scoring thereof, the supporting portion of said elevator arranged to elevate the small end of the block to position the plane thereof substantially parallel to the direction of movement of the elevator, means for reciprocating said elevator, and scoring saws for scoring the block of ice as it is moved in said elevator, thereby to produce transverse scores thereon in planes substantially perpendicular to the longitudinal axis of the block.

38. An ice scoring machine for scoring a commercial tapered block of ice handled on its narrow side or edge comprising a longitudinal conveyor, a reciprocable elevator cage adapted to straddle said conveyor and provided with means adapted to lift a block of ice from said conveyor, said last named means being formed to position the lifted block with its longitudinal axis substantially perpendicular to the direction of movement of the elevator, means for reciprocating said elevator, and scoring saws for scoring the block of ice as it is moved in said elevator.

39. The combination defined in claim 36, said hydraulic means comprising a pair of fluid pressure cylinders arranged respectively at the opposite ends of opposite sides of the machine to provide for supporting said elevator at either end without interfering with the passage of ice blocks into and out through said ends.

40. The combination defined in claim 36, said hydraulic means comprising a pair of interconnected fluid pressure cylinders arranged, respectively, at the opposite ends of opposite sides of the machine to provide for uniformly supporting said elevator at either end without interfering with the passage of ice blocks into and out through said ends.

41. In an ice scoring machine, a frame, an elevator working in said frame, scoring elements past which said elevator is adapted to be moved, means adapted to be rendered effective or ineffective for moving said elevator, and stop means adapted to be rendered effective or ineffective for halting an ice block in position to be raised and lowered in said elevator for scoring by said scoring elements, said elevator moving means and said stop means being automatically rendered effective by work entering said elevator and being ineffective after the scoring of said work to enable passage of the scored work from said elevator, thus providing for automatic actuation of the machine by work supplied thereto.

In testimony whereof I hereunto affix my signature.

GEORGE KOMP, Sr.

CERTIFICATE OF CORRECTION.

Patent No. 1,820,464.             Granted August 25, 1931, to

GEORGE KOMP, SR.

It is hereby certified that error appears in the printed specification of the above numbered patent requiring correction as follows: Page 2, line 125, after the word "sprocket" insert the word gear; page 7, line 96, claim 17, for the misspelled word "sraft" read shaft; line 115, claim 18, strike out the word "cam" and insert the same before "means" in line 116, of same claim; page 8, line 76, claim 26, for the numeral "25" read 24; page 9, line 32, claim 35, after the word "working" insert the word in; and that the said Letters Patent should be read with these corrections therein that the same may conform to the record of the case in the Patent Office.

Signed and sealed this 6th day of October, A. D. 1931.

(Seal)                                                  M. J. Moore,
                                                     Acting Commissioner of Patents.